Nov. 25, 1958  R. G. MARZOLF  2,861,601
COIL WINDING MACHINE
Filed June 9, 1955  4 Sheets-Sheet 1

Fig. 1.

INVENTOR.
ROBERT G. MARZOLF
BY
Moon & Hall
Attorneys.

Nov. 25, 1958 R. G. MARZOLF 2,861,601
COIL WINDING MACHINE
Filed June 9, 1955 4 Sheets-Sheet 2

Fig. 2.

INVENTOR.
ROBERT G. MARZOLF
BY Moore & Hall
Attorneys.

Nov. 25, 1958  R. G. MARZOLF  2,861,601
COIL WINDING MACHINE
Filed June 9, 1955  4 Sheets-Sheet 3

INVENTOR.
ROBERT G. MARZOLF
BY Moore & Hall
Attorneys.

Nov. 25, 1958 — R. G. MARZOLF — 2,861,601
COIL WINDING MACHINE
Filed June 9, 1955 — 4 Sheets-Sheet 4

INVENTOR.
ROBERT G. MARZOLF
BY
Moore & Hall
Attorneys.

United States Patent Office 2,861,601
Patented Nov. 25, 1958

2,861,601

COIL WINDING MACHINE

Robert George Marzolf, Snyder, N. Y., assignor, by mesne assignments, to Marco Industries, Inc., Womelsdorf, Pa., a corporation of Delaware Application June 9, 1955, Serial No. 514,199

17 Claims. (Cl. 140—92.1)

The present invention relates to coil winding machines, and is more particularly concerned with a machine capable of winding coils to be utilized in the manufacture of distributed wound motors. By appropriate changes, and as will become apparent from the following description, the novel winding machine of the present invention can in fact be readily utilized in the winding of coils for any desired motor application.

In the past, one of the prime considerations in the manufacture of distributed wound motors, especially from a cost standpoint, has been the procedure followed in the winding of such motors. In practice, a conventional distributed wound motor lamination normally has a total of 24, 36, 48, etc. slots which open toward the inside diameter of the stator lamination thereby to permit the placement of stator coils in the said slots. In order to assure acceptable electrical performances and characteristics for distributed wound motors, the dimensions of these slot openings must, as is well known, be held to a minimum. This latter requirement accordingly imposes an extremely serious manufacturing problem in the winding of such motors. As a result, distributed wound motors have, in the past, been wound by skein winding, hand winding, or mould winding techniques. One such technique has employed, for instance, a hand gun, which comprises merely a metal guide for the magnetic wire, and an operator, in winding a distributed wound motor, manually feeds the said hand gun through the several lamination slots, thereby to form a coil winding in the said slots. This method is, of course, extremely slow and results in very high motor costs.

In order to reduce costs somewhat, the hand gun has for the most part been dispensed with and skein winding techniques have been adopted in place thereof. When such a skein winding system is in fact employed, the coil material is first formed as an elongated skein on a separate skein-winding machine. This skein, consisting of relatively few turns of wire, is then fed back and forth through the several lamination slots comprising the motor stator thereby to form a substantially concentric type winding. This operation, again, is substantially all manual in nature. Normally a separate skein is used for each pole of the distributed wound motor so that, in practice, a total of twelve skeins are required to wind a six-pole distributed wound motor with both primary and secondary windings. This method of "skein-winding" permits a winding output of approximately ten motors per day per operator and again results in a relatively high cost distributed wound motor.

In an attempt to overcome the disadvantages of the skein winding system, some manufacturers have employed mould wound concentric coils, with each coil having its total number of turns initially wound on a coil mould. In practice, the actual techniques employed in the prior art for forming such mould wound coils have not succeeded in materially increasing manufacturing efficiency or in reducing motor cost. Again, the mould wound coils of the prior art normally are manually fed into internally open lamination slots, and because of the relatively large number of turns involved in some of the stator coils, this operation often requires that an operator fan the coil out to make it thin enough for insertion into the narrow lamination slot opening. In practice, it has been found that such mould winding methods are about on a par with the skein winding technique, discussed previously, in respect to the productive rate of the operator, and therefore prior art mould winding systems have not materially aided in reducing the cost of distributed wound motors.

A relatively recent innovation in the winding of distributed wound motors has been the introduction of automatic winding machines. Because of the extremely high initial cost of such winding machines, however, their usage has been limited, for the most part, to high production split phase and capacitor start motors. Moreover, these machines are usually set up to automatically wind only the primary winding for most types of distributed wound motors. While the said winding machines are often capable of placing these primary windings in motor stators at a much higher rate than has been possible by hand winding, skein winding, or prior art mould winding operations, it is still usually necessary to place the secondary winding in by hand. Thus, even when expensive automatic winding machines are employed, secondary winding has normally been effected by either skein winding or by concentric mould winding techniques, even on high production split phase and capacitor start motors.

It is apparent, therefore, that in the past the techniques employed in winding distributed wound motors have required that such motors be of relatively high cost, either because of the considerable manual operations necessary, or because of the extremely high cost of automatic machinery. The present invention serves to obviate the foregoing difficulties, however, and is concerned with a new mould winding technique, and, in more particular, is concerned with a novel coil winding machine which may be employed among other purposes for the winding of a complete concentric winding for each pole of a distributed wound motor. The machine of the present invention has a much lower initial cost than prior art winding machines and permits one semi-skilled machine operator to produce complete windings on distributed wound motor stators at a per unit cost far less than the rates previously possible by either manual or skein winding techniques, or by any other type of winding machine or mould winding technique known to the present time. Thus, by simplifying the entire operation of winding distributed wound motors, the mould winding technique as well as the novel winding machine of the present invention effects a substantial reduction in labor costs and further permits a substantially greater daily output per operator, thus permitting the manufacture of distributed wound motors which are considerably lower in cost than has heretofore been possible.

Accordingly, it is an object of the present invention to provide a new coil winding machine.

Another object of the present invention is the provision of a winding machine which may be utilized in forming windings for distributed wound motors.

A further object of the present invention resides in the provision of a novel mould winding technique.

Still another object of the present invention resides in the provision of a coil winding machine which substantially reduces the manufacturing cost of distributed wound motors.

Still another object of the present invention resides in a new method and apparatus for winding distributed wound motors with concentric type coils.

Another object of the present invention resides in the provision of a coil winding machine capable of winding coils of different sizes. In this respect, the said differently sized windings may be produced in a cyclically repeated sequence on the machine whereby the component coils of a complete concentric winding are immediately obtained by normal operation of the machine. It should further be noted that the said winding of coils may be either semi-automatic or completely automatic.

A still further object of the present invention resides in the provision of a coil winding machine which may be readily employed to wind coils for motors of different desired ratings as well as for motors having different numbers of poles. Thus, the winding machine of the present invention may be utilized to wind concentric type coils for two-pole, four-pole, six-pole or eight-pole motors, and for different sizes of such motors, without requiring major change in the winding machine configuration or setup.

A still further object of the present invention resides in the provision of a coil winding machine which may be readily adjusted to vary the sizes of individual coils wound thereon, as well as the number of turns in each coil.

Another object of the present invention resides in the provision of a machine for winding motor coils, which winding machine is relatively inexpensive to manufacture and to utilize, and which machine may be operated by a single semi-skilled operator.

In accordance with the foregoing objects, the present invention comprises a winding machine adapted to prepare coils for placement in motor stator laminations. The particular motor laminations preferably employed have a plurality of slots defining external rather than internal openings, and, in practice, such stator laminations are made in two pieces to permit the winding of the said slots by direct placement of mould wound coils therein.

The winding machine itself comprises a series of coil moulds removably and replaceably distributed about a rotatable turret, which turret may in turn be indexed to a plurality of distinct positions. A revolving winding head is mounted adjacent said turret at one of the index positions thereof, and the winding head is operatively associated with the said series of coil moulds to form a plurality of series-connected coil windings by the successive indexing of said turret past said winding head. The coil moulds may be of several sizes and produce wound coils of the exact dimensions required or desired to make up a complete concentric type winding for each motor pole. In practice, the said distributed coil moulds are preferably of differing sizes and these are in turn disposed in a cyclically repeated sequence, as to size, about the said rotatable turret. Thus, as the said turret is successively indexed to its plurality of positions, the several differently-sized coils required for a complete concentric type winding are automatically formed in a repeated cycle. The coil moulds themselves are each collapsible in construction, and in fact the said moulds are automatically collapsed as the turret is revolved past an operator or coil take-off position. This collapsible mould feature thus permits wound coils to be easily removed from the coil moulds, thereby allowing a single operator to operate the coil winding machine and to remove and lay wound coils in the slots of a motor stator. The number of turns for each of the said mould wound coils is controlled in the machine by an automatic winding control which preferably comprises an electrical system cooperating with a gear train of variable ratio whereby the exact number of turns for each mould size involved may be precisely obtained. In this respect, it should further be noted that the winding machine is so arranged that the said gear ratio may be readily changed whereby the number of turns on the several coils comprising a concentric type winding may be readily controlled and varied. The machine gear train, as will be described, cooperates with a rotatable winding control disc having cam-like surfaces thereon, and the said disc is in turn associated with at least one micro-switch in the said electrical system for automatically stopping the revolving winding head, through the medium of an electrical clutch and brake, when the precise number of turns desired in a single coil have been effected. Thus, in normal operation, the machine permits a single operator to automatically wind a plurality of coils of different sizes, to quickly remove wound coils from the several coil moulds, and to accurately control and vary the number of turns per coil as well as the sizes of the coils wound.

The foregoing objects, advantages and operation of the present invention will become more readily apparent from the following description and accompanying drawings, wherein.

Referring now to the several figures, like numerals of which refer to like parts throughout, the coil winding machine of the present invention preferably comprises a substantially flat table 10, supported on legs 11 and serving to carry the several machine components to be described hereinafter. Mounted on the table 10 for indexing rotation about a vertical axis is a turret 12, which is in turn arranged to carry a plurality of coil moulds 13 adjacent the periphery thereof. Beneath the table 10, and coupled to the turret 12, is an indexing mechanism 14, the construction and operation of which will be more particularly described hereinafter; which indexing mechanism 14 is coupled by a linkage 15 to a treadle 16 whereby a single operator may selectively and successively index the said turret and the coil moulds 13 thereon, past a winding position which includes a winding head 17. As will subsequently be described in greater detail, the winding head 17 is supplied from a source of wire of a desired size for a given coil winding operation, and the said winding head is in turn automatically controlled by means of an electrical control system and mechanical gear linkage, whereby it places a predetermined number of turns on each of said coil moulds as they are successively indexed past said winding position. In this respect it should further be noted that different numbers of turns may in fact be automatically placed on different ones of said coil moulds. Thus, the arrangement is such that, by indexing of the turret 12, the several coil moulds 13 are moved successively past the winding position 17 thereby to permit the winding of a plurality of series-connected coils. As will be described in greater detail subsequently, the coil moulds 13 in fact comprise a plurality of differently sized coil moulds disposed in a cyclic sequence, as to size, about the periphery of turret 12 whereby indexing of the said turret causes differently sized coils, comprising a complete concentric winding, to be formed automatically.

The particular construction of the several coil moulds 13 is of considerable importance in achieving the several objects and advantages of the present invention. This construction will now be described, and special reference is made in this respect to Figures 2 and 7.

Figure 2:
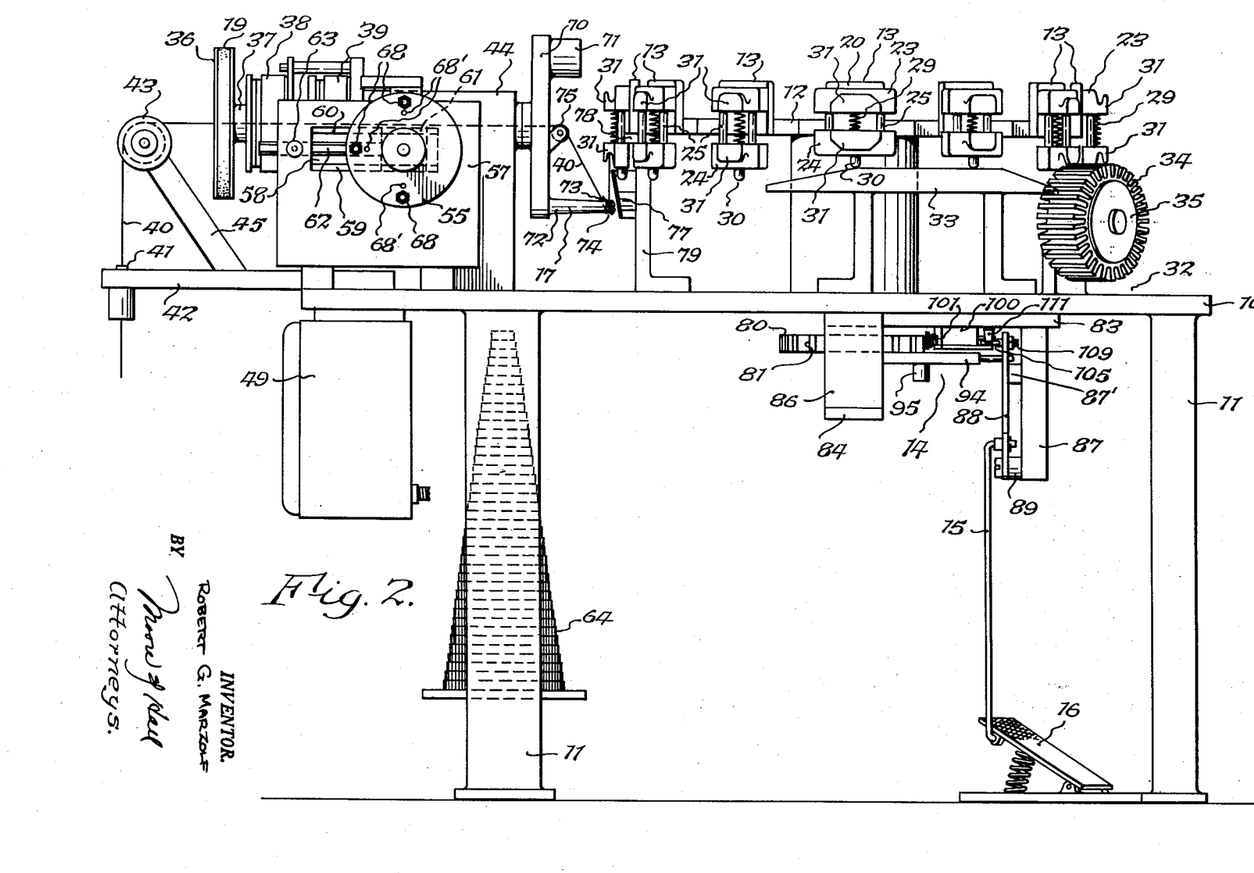
Figure 2 is a side view of the winding machine shown in Figure 1.
Figures 7, 8, 9:
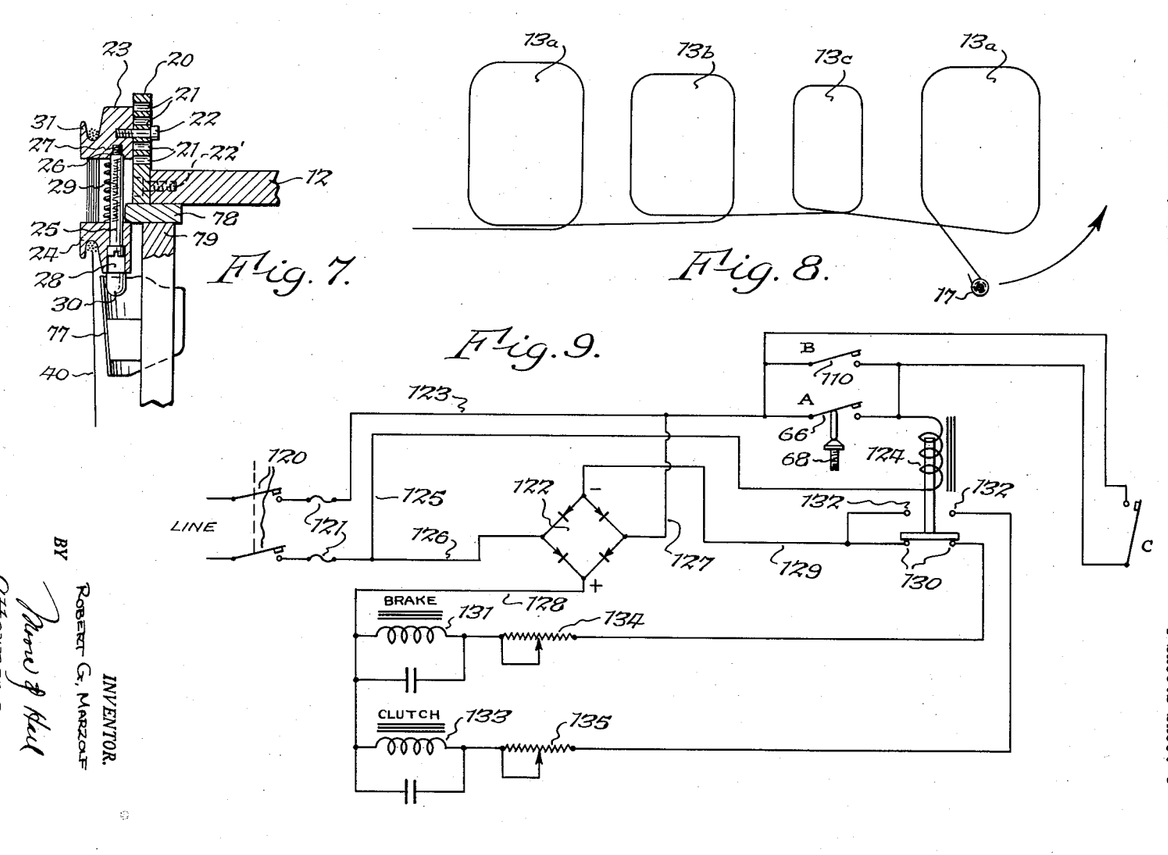
Figure 7 is a vertical sectional detail view on line 7—7 of Figure 1.
Figure 8 is a schematic representation of concentric type coils such as may be wound by the present invention.
Figure 9 is a schematic of one form of control circuit which may be used in the present invention.

Each of the coil moulds 13 is preferably so constructed that it may be readily collapsed to permit easy removal of a coil wound thereon. A coil mould 13 itself comprises a substantially planar rear plate 20 having a plurality of holes 21 formed therein. The said holes 21 are preferably arranged in two parallel and vertical rows and serve to receive bolt members 22 therethrough for mounting a front plate 23 at varying positions, dependent upon which of the holes 21 are used, with respect to the said rear plate 20. Rear plate 20 is in turn removably affixed to turret 12 by means of a threaded member 22' placed through the said rear plate 20 and into the turret 12 and the threaded member 22' is preferably formed with a hexagonal recess at the head end thereof so that it may be easily removed by an appropriate tool to facilitate interchange or replacement of coil moulds.

The rear plate 20 cooperates with a collapsible front structure comprising two relatively movable members, namely the said front plate 23 and a further plate member 24. The said member 23, as has been mentioned previously, is placed in fixed relation to the rear plate 20 preferably by bolt means 22 passing through the rear face of the said rear plate 20 and into the rear face of member 23. A pair of elongated shaft members 25 are threaded into the member 23 and the said shaft members 25 are preferably so disposed with respect to member 23 that they are kept in alignment by a recess portion 26, the threaded portion 27 of the said shafts serving merely to retain the shafts 25 within appropriate recesses formed in member 23. The collapsible member 24 of the coil mould assembly is formed with a pair of smooth-faced bores 28 through which bores the shaft members 25 are passed before being threaded into the fixed plate or member 23. As will be seen, therefore, the member 24 may slide upon the shafts 25 so that the said member 24 may in fact be collapsed by substantially vertical movement thereof upon the shafts 25. Each of the members 23 and 24 define a substantially central and conical recess between which recesses a spring 29 is placed to resiliently bias the member 24 away from member 23. Member 24 is formed, further, with a pin-like projection 30 extending from the lower surface thereof whereby a force exerted on the said pin member 30 will be transmitted to the member 24 and will cause the said member 24 to slide upward on shafts 25, against the restraint of spring member 29, toward member 23.

Each of the members 23 and 24 is formed with an integral coil-retaining projection 31, and the forward faces of the members 23 and 24, respectively, as well as the inner faces of each of the projecting portions 31, respectively, are preferably tapered as shown (see Figure 7) to facilitate the winding and removal of coils from the coil mould. This taper may be relatively slight and is preferably in the nature of five degrees. Further, a given pair of front plates 23 and 24 may be utilized with a plurality of pairs of shafts 25, the said plurality of pairs being respectively of differing lengths whereby a simple substitution of one pair of shafts 25 for a different pair will permit coils of different widths to be wound on essentially the same coil mould structure.

In the particular example shown in the drawings, the turret 12 has been made twelve-sided and carries a total of twelve coil moulds 13 of the construction described above. This twelve-sided configuration has been chosen inasmuch as it lends itself readily to the winding of coils for various motors having different numbers of poles; but it is to be understood that turret 12 may in fact carry other than twelve coil moulds. In addition, the coil moulds 13 take a number of different sizes and for the winding of a six-pole motor, for instance, these moulds in fact have projections 31 of three different cross-dimensions (see Figures 1 and 2). It is to be understood that the sizes of coil moulds 13 may be varied or selected in conformance with the required sizes of coil windings for a given motor application, and more or less than three different coil mould sizes may be required for various motor applications. Thus, for a six-pole motor, three differently sized coil moulds are utilized. On the other hand, for a four-pole motor, four differently sized coil moulds will be utilized; while for an eight-pole motor, two differently sized coils will be used; and for a two-pole motor, eight differently sized coil moulds are employed.

Figure 1:
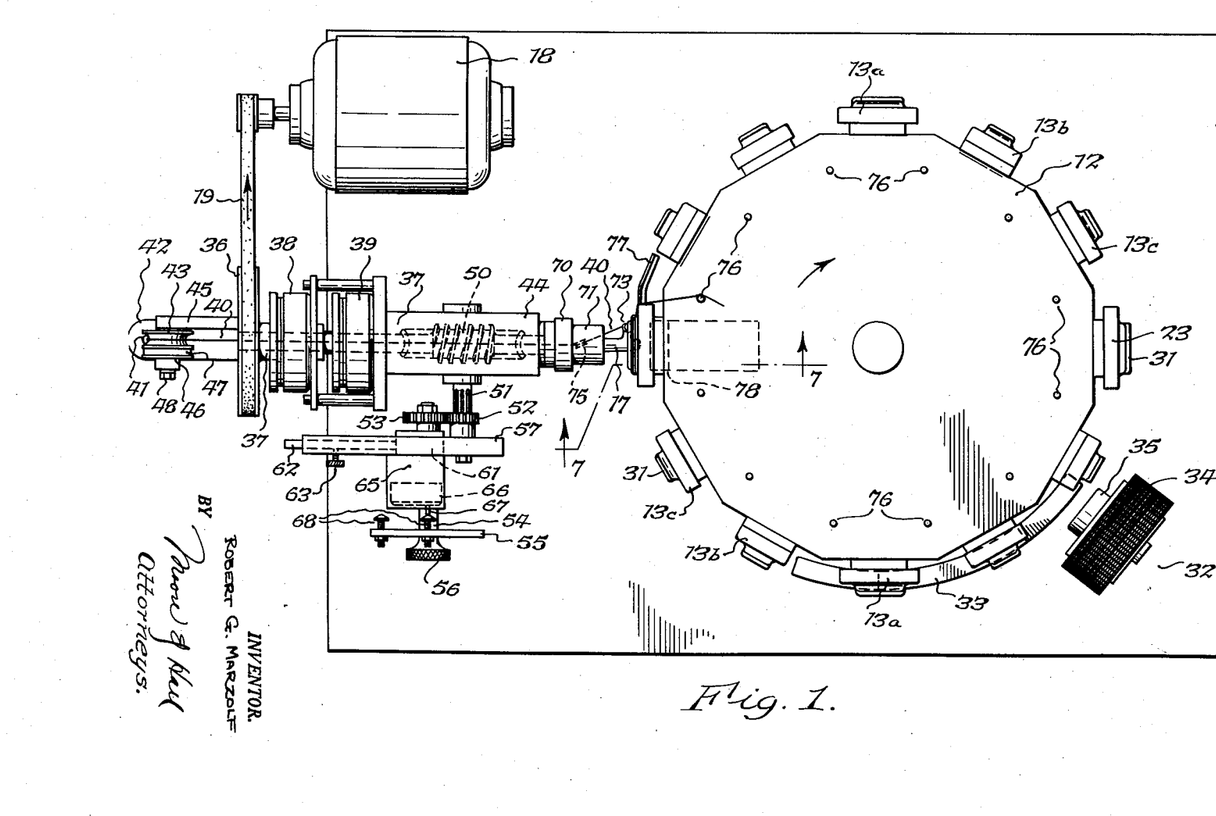
Figure 1 is a top view of a coil winding machine in accordance with the present invention.

When the coil moulds 13 have been mounted about the external periphery of the turret 12, as described, they are normally so disposed that differently sized coil moulds are repeated, as to size, in a cyclic sequence. Thus, in the winding of a six-pole motor wherein three differently sized coils are used, as shown in Figures 1 and 2, the said coil moulds 13 are mounted in a cyclic sequence of a large sized mould followed by a medium sized mould, followed by a small sized mould. One such cyclic sequence of three differently sized coil moulds is designated as 13a, 13b, 13c in Figure 1, and it is to be understood that this sequence is repeated four times about the periphery of turret 12, in the particular embodiment shown. Thus, as the said turret 12 is indexed past the winding head 17, a first coil which is relatively large in size will be wound upon the coil mould 13a; in the next indexing position a medium sized coil will be wound on mould 13b; and in the third position a small sized coil will be wound on mould 13c. This particular sequence of coil windings is shown symbolically in Figure 8, and, as may be seen from an examination of the said figure, the several differently sized coils are connected in series.

Figures 3, 5, 6:
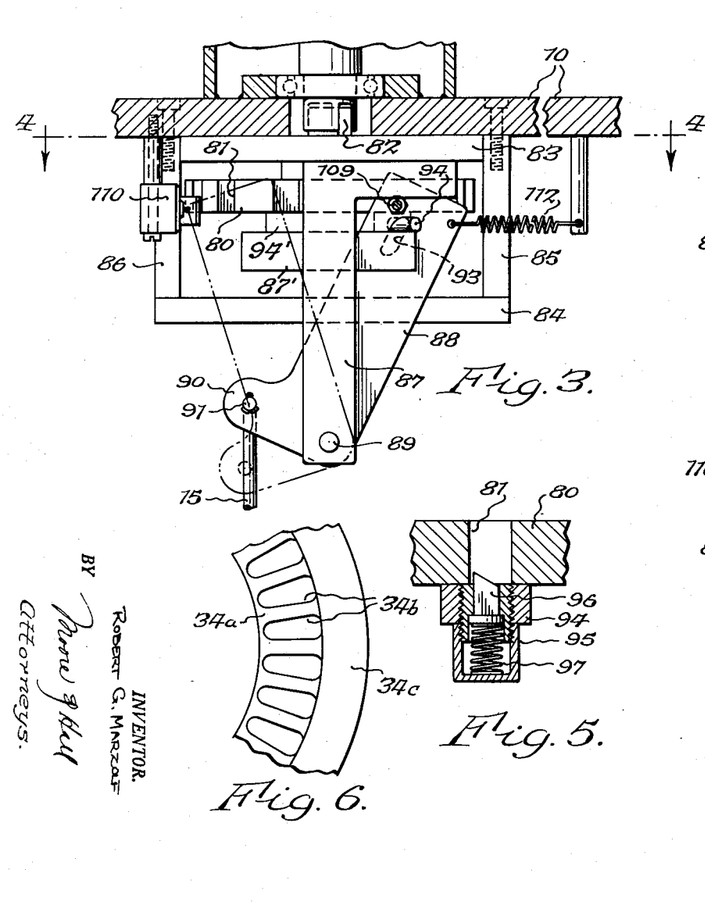
Figure 3 is an end view of a turret indexing mechanism such as may be utilized in the present invention.
Figure 5 is a vertical sectional detail view on line 5—5 of Figure 4.
Figure 6 is a partial end view of a motor lamination of the type utilized in the present invention.
Figure 4:
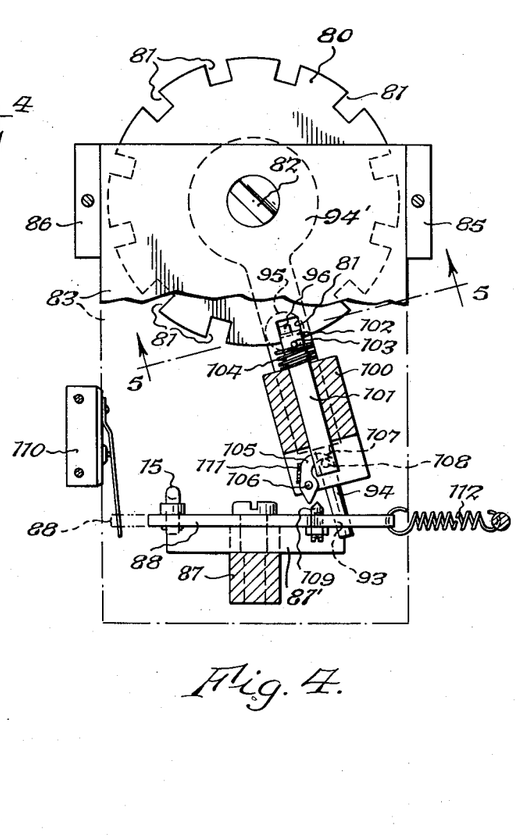
Figure 4 is a horizontal sectional view on line 4—4 of Figure 3.

The wound coils progress during the indexing operation to a take-off position 32 adjacent which take-off position a cam surface or track 33 is mounted. The track 33 is arranged as shown to lie beneath the several pins 30 of the collapsible coil moulds as they are progressed to the said take-off position 32, and by the indexing operation described, the several coil moulds 13 are successively caused to ride upward upon the upper surface of the track 33. The cam surface or track 33 thereby causes a force to be exerted on the pin 30 of each coil mould in succession thereby collapsing the mould portion 24 against the restraint of spring 29, toward the mould portion 23. This collapsing action permits coils wound on the several coil moulds 13 to be readily and successively removed by an operator standing at the take-off position 32, and in practice the operator then places each coil so removed into the appropriate slots in a stack of laminations 34, comprising a motor stator, carried on a rotatable arbor 35 adjacent the said take-off position 32. The preferred configuration of the laminations 34 is as shown in Figure 6, and it will be seen that the said laminations each comprise a main slotted portion 34a defining a plurality of outwardly open slots 34b, into which slots the mould wound coils are placed. After the laminated stator 34 has been so wound, the slots and laminations are preferably closed by a ring-like member 34c. In practice, as the turret 12 and the several coil moulds 13 are successively indexed to the take-off position 32, the cyclic disposition of the differently sized coil moulds 13 permits the machine operator to remove, in sequence, a large sized coil, then a medium sized coil, and then a small sized coil from the several coil moulds; and because of this predetermined arrangement of coil sizes the various sized coils, which are already series-connected, may be readily placed one within the other upon the stator laminations 34 to effect a complete concentric type winding with a minimum of effort.

It is preferable to utilize a coil winding machine of the type of the present invention to place but a single complete winding on a given stator 34 carried by the arbor 35. Therefore, in practice, if secondary or tertiary windings are in fact to be placed upon the same motor stator, it is contemplated that a second and/or a third machine of identical construction to that described, can be utilized, and the several machines can be arranged in a simple row or assembly-line setup. Under such a situation, once primary coils have been placed upon a motor stator, if secondary or tertiary coils are also desired, the primary-wound stator is merely passed to the next machine in the assembly-line of coil winding machines and the sequence is repeated.

Again, it must be emphasized that the limitation as to three coil sizes as well as the winding techniques just discussed relate to a system for fabricating coils for one arrangement of six-pole distributed wound motor only. Inasmuch as the turret 12 is twelve-sided, the individual coil moulds 13 may, as discussed previously, be of two, three, four or eight different sizes, for instance, so that various types of motors having different numbers of poles and/or different sizes of pole windings may be wound by the same machine by a simple replacement of coil moulds.

As has already been mentioned and as may be seen from Figures 1 and 2, for instance, the indexable turret 12 and coil moulds 13 thereon cooperate with a wire feeding arrangement, as well as with a winding arm, and an electromechanical control system. These portions of my machine will now be discussed. Mounted either on or below table 10 is a motor 18, coupled by a belt 19 to a pulley 36, which pulley is in turn mechanically connected to one end of a flyer or winder shaft 37. Shaft 37 is hollow in configuration to permit a length of wire to pass therethrough to winding head 17, and shaft 37 is coupled through an electrical clutch 38 and an electrical brake 39 to the said rotatable winding head 17, mentioned previously. In practice, wire 40 is fed from a spool of wire (not shown) placed in a container below the table 10 and passes through an opening 41 in the base plate of a bracket 42 mounted as a table extension and thence passes over a tensioning pulley 43 mounted at the upper end of an arm 45 carried on the said bracket 42. Two or more turns of wire may be taken over the said tensioning pulley 43, depending upon the wire size, and the wire 40 then passes axially down the hollow center of the flyer or winder shaft 37, which is mounted in bearings in a housing 44, through central openings in clutch 38 and brake 39, to the winding head 17.

One possible configuration of winding head 17 is best seen in Figure 2 and comprises a first elongated arm 70 coupled substantially at its mid-point to an end of the shaft 37 for rotation about a horizontal axis. One end of the arm 70 carries a counterbalance weight 71 for assuring that undue stresses are not exerted upon the bearings of shaft 37, and disposed adjacent the other end of the said elongated arm 70 is a horizontally projecting arm 72 carrying two pulleys 73 and 74 thereon. A further pulley 75 is also formed on the elongated arm 70 adjacent the central bore of hollow shaft 37. Wire 40 passing down the center of the hollow shaft 37 is passed over the pulley 75 and thence over pulley 73 to pulley 74. The turret 12 includes a number of pins 76 located respectively adjacent each of the coil moulds 13 and in practice, the coil winding machine is initially threaded by passing wire 40 over the tensioning pulley 43, down through the center of the hollow shaft 37, over pulleys 75, 73 and 74 in sequence, whereupon the free end of the wire 40 is wound about a pin 76 preparatory to the starting of coil winding operations.

Also disposed adjacent the winding position or winding head 17 is a guide plate 77 for the wire 40 which assures that, as the turret 12 is indexed from one position to the next succeeding position, the wire 40 leading from the pulley 74 of the rotating winding arm 72 is accurately positioned below the lower projecting surface 31 of the next following coil mould 13. The guiding plate 77 thus prevents the said wire 40 from binding on the under surface of portion 24 of a mould form during the indexing transition from one coil mould to the next.

While the tensioning means may take any desired configuration, in a preferred form thereof the said tensioning means comprises a double pulley, namely the aforementioned pulley 43 having a further disc 46 spaced from one flange thereof. A felt disc 47 is interposed between the facing surfaces of pulley 43 and disc 46 to provide a frictional force therebetween, and the said elements 43, 46 and 47 are carried by and coupled together on a common shaft, extending from and transverse to arm 45, through the medium of a lock nut 48. As a result, the amount of frictional force imposed by the said felt disc 47 may be varied by varying the axial position of the said lock nut 48. That is, when lock nut 48 is loosened, pulley 43 rides relatively freely between arm 45 and one surface of felt disc 47. As the nut 48 is tightened, more and more friction is imposed, by disc 47, on the facing flange of pulley 43, thereby requiring that a greater moment be applied to pulley 43 to effect rotation thereof. By this arrangement a varying and controllable tension may be applied to the wire 40, depending upon the wire size, to assure that the wire is not so stretched during the coil winding operation that its resistance is changed.

As has been mentioned previously, the motor 18 is coupled to the winding head 17 through the medium of both a clutch 38 and a brake 39. In practice, the said motor and clutch are each electrically operated and they are selectively energized through the medium of a power control unit 49. The power control or conversion unit, as will be described subsequently with reference to Figure 9, includes a relay having two sets of contacts, one of which is normally open and the other of which is normally closed. The relay coil energization is in turn controlled by at least one micro-switch (and preferably two, as will be described) mounted on the machine so that, in practice, when the clutch 38 is energized the brake 39 is deenergized, and vice versa. The clutch 38 may take the form designated as SF–400, Part No. I–25098, manufactured by the Warner Electric Brake and Clutch Company, Beloit, Wisconsin; the brake 39 may be of the type RF–400, Part No. I–25140, also manufactured by the said Warner Electric Brake and Clutch Co.; and again, the power conversion unit 49 may be of the type CWO–61, manufactured by the said Warner Electric Brake and Clutch Co.

The shaft 37, coupled to the winding head 17, includes a worm and worm wheel 50 (shown in dotted section in Figure 1) which are coupled through a further shaft 51 to a pair of meshing gears 52—53. The gear 53 is in turn coupled through a further shaft 54 to a rotatable winding control disc 55, held on the said shaft 54 by a knurled knob 56. The shaft 54 passes through a main bracket 57 which defines an elongated slot 58 therein, and the said slot 58 further defines lower and upper tracks 59 and 60, respectively. A supporting bracket 61 is provided through which the shaft 54 is passed, and as a result of this construction, it will be seen that gear 53, shaft 54, control disc 55, and knob 56 define a single mechanical unit supported by bracket 61. The said bracket 61 is movable in translation within the slot 58 and along tracks 59 and 60, and a guiding shaft 62 extends from bracket 61 and thence through an opening in one end of the said main bracket 57 whereby the said supporting bracket 61 may be placed, by a sliding motion, in varying positions along slot 58 and may then be held in place therein by a knob 63 which acts as a set screw bearing upon the guiding shaft 62. Thus, the gear 53, control disc 55, shaft 54, knurled knob 56, supporting bracket 61, and guiding shaft 62 are mechanically interconnected as a single unit which may be slidably adjusted along the tracks 59 and 60 and which may thereafter be fixed in place at any predetermined position therein by the knob 63. This arrangement permits ready interchange of the gears 52—53 to provide for the winding of any given desired number of turns on the several coil moulds, and in fact a complete set of such gears 64 may be mounted on an appropriate bracket under table 10.

Also connected to the bracket 61 and movable therewith is a small housing 65 carrying a micro-switch 66 therein which switch has an actuating arm 67 extending adjacent the peripheral path of rotatable control disc 55. The said control disc 55 in turn carries a plurality of projecting pins 68 which act as cam surfaces. The pins 68 are spaced adjacent the periphery of the control disc 55, and rotation of the said control disc 55 through successive predetermined arcs thereby causes selective actuation of the switch 66 to control the state of energization of the clutch 38 and brake 39. In this respect, for instance, let us assume that the winding operation is properly commenced through the power control unit 49, to be described. Under such circumstances the clutch 38 is energized and brake 39 is deenergized. Power is therefore coupled from motor 18 to shaft 37, and thereby causes rotation of winding arm 17 about a coil mould 13 at the winding position. Rotation of shaft 37, due to this winding operation, is in turn coupled by worm and worm wheel 50 to gear train 52—53, and thence by shaft 54 to control disc 55. Thus, rotation of winding head 17 causes a corresponding rotation of control disc 55, and the actual relationship between the said corresponding rotations of winding head 17 and control disc 55 is determined by the chosen gear ratio 52—53 interposed therebetween. Rotation of control disc 55 ultimately causes a cam surface 68 to impinge upon the arm 67 of switch 66 and this in turn causes the brake 39 to be energized and clutch 38 to be deenergized. Thus, rotation of disc 55 (due to rotation of winding head 17) causes the winding head 17 to be halted after a precise number of winding rotations have been effected, and this number of turns is itself dependent upon the gear ratio 52—53 which is chosen, as well as upon the relative placement of the several pins 68 on disc 55. In practice, once rotation of disc 55 has caused the winding operation to be halted, the turret 12 must, under normal operating conditions, be indexed to the next position before further winding can occur and, in fact, a preferred embodiment of the present invention causes the indexing operation itself to initiate such further winding.

For the winding of a six-pole motor, three pins 68 are placed about the periphery of the control disc 55 and these pins need not be equiangularly spaced from one another (see Figure 2), so that, in the particular example shown, rotation of said control disc 55 through a full 360° will in fact cause two coils to be wound, each with a first number of turns thereon, and will further cause a third coil (in the three coil sequence) to be wound with a second number of turns thereon, which is double that of the first number of turns. Thus, for a given gear ratio 52—53, the number of turns placed on a given coil mould, as well as the relative number of turns placed on the several moulds comprising a mould sequence, will depend upon the number and relative position of the projections 68. The specific control disc 55 shown in the drawings is merely illustrative of one form of disc which may be utilized in the winding of coils for a six-pole motor. It is to be understood that for different winding applications, the disc 55 may be readily removed by removing the knurled knob 56, and other control discs can then be placed on the shaft 54 which other control discs may have different numbers of projections 68 and/or different locations of projections 68, in order to properly control the number of turns to be placed on the several coils comprising a complete concentric winding. Again, rather than using a combination of disc 55 and switch 66, the two may be combined into a single rotary switch arrangement.

Inasmuch as each of the coil moulds 13 is collapsible, as has been described, the winding of a coil by the winding head 17 would, in the absence of preventive means, and because of the tension in wire 40 and the rotary action of the winding arm, tend to cause a coil mould at the winding position to collapse during the winding operation. The coil winding machine of the present invention is therefore provided with a mould lock 78 fastened to a fixed portion 79 of the machine adjacent the winding position. The mould lock 78 takes the form of a projecting plate (see Figure 7), the lower surface of which is in close proximity to the upper surface of a coil mould portion 24 at the winding position. Because of this configuration, as each of the coil moulds 13 is successively indexed to the winding position the mould lock 78 is automatically positioned immediately above the respective mould portion 24 whereby the member 24 is prevented from being collapsed during the winding operation thereby assuring that each coil wound on its corresponding coil mould will not be of an inaccurate size due to any premature collapse of the coil mould.

As was mentioned previously, the turret 12 is successively indexed through the agency of an indexing mechanism 14. The actual construction and operation of a preferred form of indexing mechanism will be most readily seen from an examination of Figures 2 to 5 inclusive. In the main, it should be noted that the overall indexing mechanism operates substantially as a ratchet and pawl of much improved construction, with a superadded latching or locking mechanism mounted on a fixed portion of the machine and cooperating with the "ratchet" portion of the said indexing mechanism. The arrangement thus permits the turret 12 to be indexed in one direction only and, further, positively locks the said turret against rotation between indexing operations. Referring now to the drawings, it will be seen that the indexing mechanism 14 comprises a disc-like plate member 80 having a plurality of substantially rectangular recesses 81 spaced about the external periphery thereof, one recess 81 being supplied for each of the desired indexing positions. In the particular example shown, inasmuch as twelve coil moulds are utilized, there are twelve such recesses 81 disposed about the periphery of plate 80. Plate 80 further defines a key-like vertical projection 82 which engages a complementary slot in the bottom of the central support shaft of turret 12, and in practice the projecting key 82 is preferably formed slightly off-center. The disc 80 is carried between substantially flat plates 83 and 84 which are in turn interconnected by vertical members 85 and 86. Also coupled to one end of the member 83 is an L-shaped member 87 carrying a lever member 88 at one end thereof, at a pivot 89. Lever 88 defines an ear 90 having a further pivot point 91 therein, which further pivot point is connected to the linkage 15, and thence to the treadle 16. The other end of lever 88 is formed with an elongated aperture 93 which cooperates with the locking structure and indexing structure now to be described.

The indexing structure itself comprises an elongated shaft 94, the outer end of which extends through the aperture 93 formed in lever 88. This outer end of shaft 94 rides upon the upper surface of a block 87' attached to member 87 and disposed between said member 87 and lever 88 (see Figures 2, 3 and 4). Block 87' thus assures that the movement of said outer end of shaft 94 is restricted to a single plane. The other or inner end of shaft 94 is rotatably supported adjacent the central shaft supporting plate 80 by an annular bearing surface 94' forming an integral part of shaft 94 and surrounding an extension of the supporting shaft for plate 80 (see Figure 4). The said shaft 94 carries on its lower surface, and at an intermediate portion thereof, a cylindrical member 95 having a hollow inner configuration (see Figure 5). Within the said member 95 is placed a pawl-like projection 96 slidably passing through shaft 94 (see Figure 5) and having its upper surface inclined at substantially 45°, as shown; and this projection extends above shaft 94 whereby it is successively urged into a recess 81 of the disc 80 by means of a spring 97. In practice therefore, as the shaft 94 tends to be moved, by lever 88, in a clockwise direction (as viewed in Figure 4) through an arc in a plane substantially parallel to and closely adjacent the disc 80, the projection 96 will bear upon an inner surface of one of the reccesses 81 and thereby will index the plate 80, in accordance with typical ratchet and pawl concepts. This indexing can occur in one direction only, for as the lever 88 and shaft 94 are moved in the other direction, the projection 96 will be depressed against the spring 97 due to the slanted upper surface configuration of projection 96, again in accordance with well known ratchet and pawl arrangements, until the said projection 96 falls into the next succeeding recess 81.

A locking mechanism is provided to assure that until the treadle 16 is actually depressed by an operator, the turret 12 cannot move. This locking mechanism comprises a supporting bracket 100 rigidly affixed to structural member 83 and carrying a slidably movable shaft 101 therein. One end of the locking shaft 101 is formed with a locking projection 102 adapted to fit into each of the recesses 81 in disc or plate 80, above the location of projection 96. The shaft 101 further carries a pin member 103, and a spring 104 is interposed between the said pin member 103 and the supporting bracket 100, which spring tends to urge the shaft 101 and its locking projection 102 into a recess 81, thereby locking the turret 12 against rotary movement. Also carried by the bracket 100 is a latch 105 pivoted to the said bracket 100 at a point 106, and having an end 107 to one side of said pivot which selectively bears on a pin 108 coupled to the locking shaft 101. The lever 88 carries a projection 109 which is in close proximity to one end of the latch member 105, on the opposite side of pivot 106.

As may be seen from a study of the foregoing construction, pressure upon the treadle 16 will be coupled through linkage 15 to the ear 90 of lever 88 causing the said lever 88 to pivot in a counterclockwise direction (as viewed in Figure 3), about its pivot point 89. During the initial part of this pivotal movement of the said lever 88, the projection 109 is caused to bear upon latch member 105 thereby causing the said latch member to be moved about its pivot 106 and thereby to exert a force through portion 107 against pin 108 causing the shaft portion 102 to be pulled out of recess 81 against the restraint of spring 104. This action occurs during the initial part of the movement only, and after this initial part of movement, further movement of the lever 88 due to a continued downward motion of the linkage 15 will cause the indexing structure previously described (i. e. 94—95—96—97) to transmit an angular force to the disc 80 causing it to be moved or indexed through an appropriate arc. After the initial part of the rotary or indexing movement of disc 80, the outer end of locking projection 102 rides upon a portion of the external peripheral surface of plate 80 between recesses 81. Thus, as the lever arm 88 is moved through an arc about pivot point 89, the projection 109 first unlatches the locking arm 102 from the recess 81 and continued motion of arm 88 transmits a force through shaft 94 and projection 96 to cause indexing of the plate 80.

After the downward stroke caused by the treadle 16 has reached its downwardmost position, the plate 80, and therefore the turret 12, has been indexed to the next coil mould position, and the locking projection 102 is then forced by the spring 104 into the recess 81 corresponding to the said next position. Thus, the indexing mechanism and the turret 12 coupled thereto are automatically and positively locked against rotation at the bottom of the downward treadle stroke. A microswitch 110 is mounted on the underside of the table 10 adjacent the arm 88 and the said switch 110 is actuated by the said arm 88 at its extreme position, caused by the downward movement of the treadle 16, whereby a single downward stroke of the treadle 16 causes the turret to be indexed to its next position, causes the said turret to be automatically locked by the projection 102 falling into the next recess 81, and, through the microswitch 110, causes the winding head 17 once more to be energized through clutch 21. The locking mechanism is provided with a small leaf spring 111 adjacent the latch 105, and this spring 111 serves to prevent latch 105 from being pivoted out of operative position, with respect to pin 108, during the "return stroke" of lever 88 and projection 109 thereon. Thus, a single downward stroke of treadle 16 causes indexing of turret 12 and reenergization of the winding head 17, and a release of foot pressure on the said treadle permits a spring 112 connected between arm 88 and table 10 to merely return the said arm to its original position preparatory to the next indexing operation.

In the particular indexing arrangement of the present invention, the turret 12 has been indexed manually, as has been described. This particular arrangement is utilized since, in the manufacture of relatively small distributed wound motors, individual coils are wound too rapidly to permit an operator to remove and place an already wound coil during the time allotted to the winding of another coil. Automatic indexing can in fact be utilized, however, when the time consumed in the winding of an individual coil is of sufficient length to permit an operator to remove a wound coil from its respective coil mould, and, if desired, to place the said wound coil on a motor stator. When such automatic indexing is to be effected, a further electrical clutch, for instance, can selectively couple a source of power to the indexing mechanism of the present invention, and the said further electrical clutch may be energized or deenergized, along with clutch 38 and brake 39, through the agency of switch 66.

Let us now examine the system of control which permits the previously described semi-automatic operation to be effected. As has already been mentioned, the operation of the winding head 17 is controlled through an electrical clutch 38 and an electrical brake 39. Each of these in turn is under the control of a power control unit 49. The control arrangement is such that when the clutch 38 is energized, the brake 39 is deenergized, and vice versa. The system is also responsive to the micro-switch 66 adjacent the winding control disc 55 and to the microswitch 110 adjacent the latching mechanism. Referring now to Figure 9, it will be seen that the power control unit 49 comprises a main line switch 120 coupled through a pair of fuses 121 and through the several switches and control relay, to be described, to a rectox or rectifier unit 122. One of the input lines 123 is coupled through switches A, B, and C, each of which is connected in parallel, to the coil 124 of a relay device, and the other end of the said relay coil 124 is coupled to the other input line 125. The switch A corresponds to microswitch 66 and is arranged to be normally closed in construction. However, at the beginning of any winding operation, the disc plate 55 is so located that one of the projections 68 bears upon projecting arm 67 of the switch 66 to hold the said switch A (66) in an open position. Switch B (corresponding to micro-switch 110) is normally open in construction, as is the start-switch C. Thus, at the beginning of any operation, each of the switches A, B and C is open and no energy can be transmitted to the coil 124 of the relay. Energy is nevertheless coupled from the input lines through lines 126 and 127 to the rectifier unit 122, and the output potential of rectifier 122 is in turn coupled through lines 128 and 129 via the closed contacts 130 of relay 122, to the brake coil 131. Thus, upon the closing of the line switch 120 and without any other operation, the brake coil 131 of brake 39 is energized and the winding head 17 is positively restrained from rotary or winding movement.

To initiate operations, the start-switch C is momentarily closed. This operation permits energy to pass to the relay coil 124, breaking the normally closed relay contacts 130, (thus deenergizing the brake 39), and closing the relay contacts 132. The closing of relay contacts 132 in turn causes the output potential of rectifier unit 122 to be applied via the now closed terminal 132 to the clutch coil 133 of clutch 38, thus causing rotation of the main shaft 37, of winding head 17, and also causing rotation of the disc plate 55 via the worm and gear train 50—51—52—53, etc. This initial rotation moves the pin projection 68 of the turn control disc 55 away from micro-switch A (66) causing the said micro-switch 66 to assume its normally closed configuration, and thus, even though the switch C was closed but momentarily, the switch A (66) maintains energization of the clutch coil 133 and causes continued rotation of the winding head 17 whereby a coil is wound, as been described. This winding procedure continues until the next following projecting or cam portion 68 on the disc 55 is caused to bear upon the micro-switch 66 (A) whereby the said next projection 68 causes the said micro-switch A to be opened, breaking the energy path to clutch coil 133, thus deenergizing the clutch 38, and causing the brake 39 to be energized as before. Because of the precise positioning of the several projections 68, as well as because of the configuration of the gear train 52—53 interposed between the turn control disc 55 and the worm 50 carried by the winding arm shaft 37, a precise number of turns is laid upon a coil mould 13 at the winding position during the rotation of control disc 55 between its projecting portions 68. When the said next projecting portion 68 is in fact caused to impinge upon switch A (66), the winding of the coil stops and further winding cannot be commenced until the clutch 38 is once more energized. The clutch 38 is in fact next energized through the medium of micro-switch B (110), which is mounted adjacent the indexing mechanism and this is effected, as has been described previously, by full depression of the treadle 16 to exert a force, through the linkage 15, upon the arm 88 of the indexing mechanism. The resulting movement of the said lever arm 88 to its extreme position depresses the micro-switch 110 (B) once more causing energization of the clutch 38 and deenergization of brake 39 whereby a next coil winding operation commences. Thus, once the winding operations have been started by momentary depression of the start-switch C, an operator standing at the take-off position 32 is in complete control of all subsequent operations through the medium of the treadle 16 alone. Rheostats 134 and 135 are supplied, in series respectively with brake and clutch coils 131 and 133, to provide a responsiveness or sensitivity control for the said clutch and brake.

The number of turns on each mould wound coil is predetermined by the gear ratio 52—53 and by the positions and numbers of the projecting studs 68 on control plate 55. Thus, an operator, once the machine is set up, is assured that after the proper number of turns have been placed on a coil mould, the winding head will stop its rotation, and the said winding head will not resume its winding function until, by depression of the treadle 16, the machine is indexed to the next coil position. This having been accomplished, the proper number of coil turns will again be placed automatically upon the next following coil mould. It should be noted that under some circumstances it may be desirable to eliminate the start-switch C and in such a circumstance, the switches A and B are all that need be provided. With such an arrangement, the turret 12 should be so located at the beginning of winding operations that the coil mould directly in front of the winding head 17 is actually the one ahead of the coil mould on which the first coil is to be wound. The operator could then start the winding operation by merely depressing treadle 16 causing a first or initial indexing of the turret 12 to the proper first coil position whereupon the winding operation will be commenced through the closing of switch B (110) rather than by use of an auxiliary start-switch. If for some reason, a given coil mould must be rewound, for example if the wire 40 should break or if the wire on a given spool should run out, the winding control disc 55 may be reset by loosening the knurled knob 56 and rotating the disc back manually. To assure proper alignment of the disc, apertures 68' are provided in the control disc 55 respectively adjacent each of the stop positions 68, and these apertures have a complementary aperture in a fixed portion of the machine structure, such as in the housing 65 of micro-switch 66. Thus, once the control disc 55 is turned to a desired position, an aligning pin may be placed through said apertures to assure proper alignment of the said control disc 55 with respect to the remainder of the control system. This aligning pin may be included permanently on each control disc or on the machine itself and may take the form of a spring biased rivet selectively engageable with a complementary alignment aperture, for instance, by partial rotation of the said aligning pin.

As may be seen from the foregoing discussion, the winding machine of the present invention, in its preferred embodiment, provides for the semi-automatic and relatively inexpensive formation of mould wound coils, as well as for the ready fabrication of distributed wound motors therefrom. It is to be understood that the particular expedients disclosed are illustrative only and are not to be construed as limitative of my invention. Many variations in the several components comprising my overall machine will suggest themselves to those skilled in the art, and these variations are meant to fall within the broad scope of my invention as defined in the appended claims.

Having thus described my invention, I claim:

1. A coil winding machine comprising a rotatable turret, means for indexing said turret to a plurality of distinct stop positions, said indexing means comprising ratchet means attached to said turret and movable pawl means adjacent said ratchet means, a plurality of coil moulds distributed about the periphery of said turret, each of said coil moulds comprising first and second coil retaining portions one of which is movable toward the other whereby each of said coil moulds is collapsible in construction, coil winding means adjacent a first one of said stop positions for winding coils on successive ones of said coil moulds as they are indexed to said first stop position, first control means for halting operation of said coil winding means after a predetermined number of turns have been placed upon a coil mould at said first stop position, second control means responsive to movement of said pawl means for reinitiating operation of said coil winding means after a next successive coil mould is indexed to said first stop position, and stationary cam means adjacent a second one of said stop positions disposed in the path of movement of movable ones of said coil retaining portions for successively collapsing each of said coil moulds as said coil moulds are indexed past said cam means at said second stop position, thereby to facilitate removal of coils wound on said coil moulds, said stationary cam means being mounted on said coil winding machine at a position adjacent to and spaced from said turret.

2. A coil winding machine comprising a turret rotatably mounted on a frame, said turret having a plurality of coil moulds thereon, said coil moulds being of differing sizes and each of said coil moulds including first and second coil retaining portions one of which portions is movable toward the other portion whereby said coil moulds are selectively collapsible in construction, resilient means interposed between said first and second coil retaining portions of each of said coil moulds for urging said portions apart from one another, means for rotating said turret so that said coil moulds are moved successively between first and second locations on said machine, coil winding means mounted on said frame adjacent said first location, said coil winding means being separate and distinct from said coil moulds and being adapted to wind a coil on each of said coil moulds when each said mould is at said first location, and mould collapsing means adjacent said second location, said mould collapsing means comprising a cam surface located on a stationary portion of said frame and adapted to bear upon the movable one of said coil retaining portions as said turret is rotated thereby to exert a force on said movable coil retaining portion in opposition to that of said resilient means.

3. The machine of claim 2 including means carried by said frame adjacent said first location for preventing collapse of said coil moulds as they are wound by said coil winding means.

4. The machine of claim 2 in which said differing size coil moulds are disposed in a repeated sequence, as to size, about the periphery of said turret.

5. The machine of claim 2 including control means coupled to said coil winding means for halting the operation of said coil winding means after a predetermined number of coil turns have been effected.

6. The apparatus of claim 2 in which said coil winding means includes a rotatable shaft, said coil winding machine including driving means coupled via clutch means to said shaft, and control means responsive to a predetermined rotation of said shaft for controlling the engagement of said clutch means.

7. The apparatus of claim 6 in which said clutch means is electrically responsive, said control means comprising rotary switch means mechanically connected to said rotatable shaft and electrically connected to said clutch means.

8. The apparatus of claim 7 in which said driving means is also coupled to said shaft via electrical brake means, and power control means coupled to both said electrical brake means and electrical clutch means, whereby when said brake means is energized said clutch means is deenergized, and vice versa.

9. A coil winding machine comprising a rotatable turret mounted on a stationary frame, a plurality of coil moulds distributed adjacent the periphery of said turret, coil winding means adjacent said turret for winding coils on successive ones of said coil moulds, said coil winding means including a rotatable shaft having a winding arm connected to one end thereof and control means responsive to rotation of said shaft for halting rotation thereof after a predetermined number of revolutions have been effected, indexing means coupled to said turret for selectively rotating said turret to a plurality of distinct stop positions, said indexing means comprising a circular ratchet disc attached to and substantially co-axial with said turret, a treadle operated pawl means adjacent said ratchet means, said pawl means being pivotally attached to said frame and being swingable between first and second positions under control of said treadle, and switch means coupled to said control means for reinitiating rotation of said shaft and winding arm after said turret has been indexed, said switch means being located in the path of movement of said pawl means whereby movement of said pawl means under control of said treadle simultaneously indexes said turret and reinitiates rotation of said winding arm.

10. The apparatus of claim 9 in which said coil winding means includes a motor and an electrical clutch interposed between said motor and said shaft, said switch means being arranged to control the state of energization of said electrical clutch.

11. A coil winding machine comprising a turret having a plurality of coil moulds thereon, said coil moulds being of differing sizes and being arranged in a cyclic sequence as to size about the periphery of said turret, each of said coil moulds comprising a stationary portion attached to said turret and a movable portion attached to said stationary portion adjacent said turret, means for rotating said turret so that each of said coil moulds are moved successively between first and second locations on said machine, coil winding means adjacent said first location, and mould collapsing means adjacent said second location, said mould collapsing means comprising a stationary cam surface spaced at a distance adjacent to said turret and disposed in the path of said movable coil mould portion as said turret is indexed, whereby indexing of said turret causes said movable coil mould portion to impinge upon said stationary cam surface and to be moved thereby toward said stationary coil mould portion.

12. A form for winding coils comprising a first coil retaining flange portion, shaft means fixedly attached to said first portion, a second coil retaining flange portion slidably carried on said shaft means whereby said second portion may move slidably on said shaft means toward and substantially into contact with said first portion, and spring means extending between said first and second coil retaining flange portions for resiliently urging said portions apart from one another.

13. A form for winding coils comprising a first block having a first coil retaining flange extending therefrom, a plurality of spaced elongated shafts attached to and extending in substantially parallel relation to one another from said first block, a second block having a second coil retaining flange extending therefrom, said second block having a plurality of bores extending therethrough and complementary respectively to said plurality of shafts whereby said second block may be slidably carried by said shafts for movement toward and substantially into contact with said first block as well as away from said first block, and spring means engaging both said first and second blocks and extending between said blocks for resiliently urging said blocks apart from one another.

14. The combination of claim 13 wherein said shafts are removably attached to said first block whereby shafts of varying length may be replaceably utilized with said first and second blocks thereby to alter the maximum distance available between said first and second coil retaining flanges.

15. A coil winding machine comprising a frame having a rotatable turret mounted thereon, a coil mould mounted on said turret, means for rotating said turret thereby to move said coil mould, said coil mould including a movable coil retaining portion extending from said turret toward said frame, a flyer arm mounted at a first position on said frame for winding a coil on said coil mould when said coil mould is at said first position, said coil being wound in part about said movable coil retaining mould portion, a stationary cam surface mounted at a second position on said frame, said cam surface being spaced from said turret and being disposed in the path of movement of said movable coil retaining mould portion, whereby said cam surface causes said movable mould portion to move away from said frame and toward said turret as said turret is rotated past said second position thereby to release said coil from said mould, and spring means carried by said coil mould and attached to said movable coil retaining mould portion for returning said movable mould portion to a predetermined position relative to said turret after said coil mould has moved past said stationary cam surface.

16. In a coil winding machine, a frame, a turret mounted for rotation on said frame, a coil mould mounted on the outer periphery of said turret, said mould including an upper portion attached to said turret at a stationary position relative to said turret and a lower portion extending away from said turret toward said frame and movable relative to said turret, spring means disposed between said upper and lower mould portions for normally holding said movable lower mould portion at a preselected position spaced from said stationary upper mould portion, means for rotating said turret thereby to move said coil mould relative to said frame, and mould collapsing means at a fixed position on said frame in the path of movement of said lower mould portion for engaging said lower portion during rotation of said turret thereby to move said lower mould portion toward said upper mould portion against the restraint of said spring means, said spring means being operative to return said lower mould portion to said preselected position after said coil mould moves past the position of said mould collapsing means during rotation of said turret.

17. The combination of claim 16 wherein said turret is of substantially flat configuration, said flat turret being mounted for rotation in a substantially horizontal plane, said coil mould extending from the periphery of said turret in a substantially vertical plane transverse to the plane of said turret.

References Cited in the file of this patent

UNITED STATES PATENTS

| | | |
|---|---|---|
| 1,401,520 | Clauss | Dec. 27, 1921 |
| 1,633,068 | Cole | June 21, 1927 |
| 1,642,229 | Cole | Sept. 13, 1927 |
| 2,011,114 | Papin | Aug. 13, 1935 |
| 2,046,883 | Robbins | July 7, 1936 |
| 2,053,764 | Chapman | Sept. 8, 1936 |
| 2,114,287 | Cullin | Apr. 19, 1938 |
| 2,246,608 | Taylor | June 24, 1941 |
| 2,279,323 | Johnson | Apr. 14, 1942 |
| 2,317,290 | McIlvried | Apr. 20, 1943 |
| 2,697,470 | Sampatacos | Dec. 21, 1954 |
| 2,712,836 | Marzolf | July 12, 1955 |